(12) United States Patent
Khizar et al.

(10) Patent No.: US 12,058,785 B2
(45) Date of Patent: Aug. 6, 2024

(54) HOUSEHOLD APPLIANCE WITH IMMERSIBLE HEATER

(71) Applicant: WHIRLPOOL CORPORATION, Benton Harbor, MI (US)

(72) Inventors: Muhammad Khizar, Saint Joseph, MI (US); Ermanno Buzzi, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 793 days.

(21) Appl. No.: 17/097,334

(22) Filed: Nov. 13, 2020

(65) Prior Publication Data

US 2021/0176829 A1 Jun. 10, 2021

(30) Foreign Application Priority Data

Dec. 5, 2019 (EP) .................................. 192138436

(51) Int. Cl.
| | |
|---|---|
| *H05B 3/14* | (2006.01) |
| *A47L 15/42* | (2006.01) |
| *B82Y 30/00* | (2011.01) |
| *D06F 39/04* | (2006.01) |
| *D06F 39/08* | (2006.01) |
| *H05B 3/00* | (2006.01) |

(52) U.S. Cl.
CPC .......... *H05B 3/145* (2013.01); *A47L 15/4214* (2013.01); *A47L 15/4285* (2013.01); *B82Y 30/00* (2013.01); *D06F 39/04* (2013.01); *D06F 39/088* (2013.01); *H05B 3/0014* (2013.01); *H05B 2203/013* (2013.01); *H05B 2203/021* (2013.01)

(58) Field of Classification Search
CPC ........ H05B 3/145; H05B 3/0014; H05B 3/04; H05B 3/26; H05B 3/78; H05B 2203/013; H05B 2203/021; H05B 2203/011; A47L 15/4214; A47L 15/4285
See application file for complete search history.

(56) References Cited

U.S. PATENT DOCUMENTS

| 8,581,158 B2 | 11/2013 | Heintz et al. |
| 10,010,238 B2 | 7/2018 | Miller et al. |
| 10,134,502 B2 | 11/2018 | Elverud |
| 2005/0067406 A1 | 3/2005 | Rajarajan et al. |

(Continued)

FOREIGN PATENT DOCUMENTS

| CN | 110418442 A | 11/2019 |
| DE | 102011089757 A1 | 6/2013 |

(Continued)

OTHER PUBLICATIONS

CNT Film Heater, Daewha Alloy Tech Co., Ltd., 17-60, Sanupdanji-Gil, Myeoncheon-Myeon, Dangjin-Si, Chungcheongman-Do, Korea, 7 Pages, Accessed Nov. 11, 2020.

(Continued)

*Primary Examiner* — Shawntina T Fuqua
(74) *Attorney, Agent, or Firm* — McGarry Bair PC (57) ABSTRACT

A household appliance includes a treating chamber and a liquid sump. A liquid circuit fluidly couples the liquid sump and the treating chamber. An immersible laminate heater is located within the liquid sump. The immersible laminate heater includes a pair of electrodes and a structure including at least a first layer and a second layer.

22 Claims, 6 Drawing Sheets

(56) References Cited

U.S. PATENT DOCUMENTS

| | | | | |
|---|---|---|---|---|
| 2021/0337634 A1* | 10/2021 | Khizar | .................. | H05B 3/145 |
| 2022/0265117 A1* | 8/2022 | Lyon | ....................... | A47L 15/48 |
| 2022/0394821 A1* | 12/2022 | Tong | ....................... | H05B 3/14 |
| 2023/0233365 A1* | 7/2023 | Augustine | .............. | H05B 3/342 |
| | | | | 219/387 |

FOREIGN PATENT DOCUMENTS

| | | | |
|---|---|---|---|
| DE | 102018133341 A1 * | 6/2020 | |
| EP | 1004266 A1 | 5/2000 | |
| EP | 1004266 A1 * | 5/2000 | ......... A47L 15/4219 |
| EP | 2336666 A2 | 6/2011 | |
| EP | 3040013 A1 | 7/2016 | |
| KR | 20150019467 A | 2/2015 | |
| KR | 101642701 B1 | 8/2016 | |
| KR | 101698841 B1 | 1/2017 | |
| KR | 101745440 B1 | 6/2017 | |
| KR | 20170143094 A | 12/2017 | |
| KR | 101817739 B1 * | 1/2018 | |
| KR | 20190065223 A | 6/2019 | |
| KR | 20190065223 A * | 6/2019 | |
| NL | 8300308 A | 8/1984 | |
| WO | WO-2012014638 * | 4/2012 | |
| WO | 2016186316 A1 | 11/2016 | |

OTHER PUBLICATIONS

European Search Report for Counterpart EP19213843.6, Dated Jul. 6, 2020, 9 Pages.

* cited by examiner

HOUSEHOLD APPLIANCE WITH IMMERSIBLE HEATER

CROSS-REFERENCE TO RELATED APPLICATIONS

This application claims priority to and the benefit of European Patent Application Serial No. 192138436, filed Dec. 5, 2019, which is hereby incorporated herein by reference.

TECHNICAL FIELD

This description relates to a household appliance, and more specifically to a household appliance with an immersible heater.

BACKGROUND

Household appliances perform a variety of cycles of operation on various articles. In one form or another, most household appliances have a treating chamber holding an article that is treated according to a cycle of operation. For example, laundry treating appliance, such as clothes washers/dryers, have a treating chamber in which an article, such as a laundry item, is placed for a washing, refreshing, de-wrinkle, drying, or other cycle of operation. Dish treating appliances, such as dishwashers, have a treating chamber in which a dish is placed for washing, sanitizing, or other cycle of operation. Refrigerators having a treating chamber, such as a cooler or freezer, in which articles are cooled or frozen, respectively. Cooking appliances, such as ovens and microwaves, have a treating chamber in which articles, such as food items, are heated or cooked. These examples are merely illustrative. Such household appliances can have a controller that implements a number of user-selectable, pre-programmed cycles of operation having one or more operating parameters. The user can select the desired cycle of operation.

Such household appliances include a structure, such as a tub, that can have an access opening and which at least partially defines the treating chamber into which items or articles can be placed to undergo a washing or treating cycle of operation. A closure, such as a door assembly, is provided to selectively open or close the access opening to allow or prevent user access to the treating chamber.

In appliances that use water or other liquids as part of or as a byproduct of the cycle of operation, a sump can be provided with or fluidly coupled to the tub and can have a heater or heating element to heat liquid present within the sump. The heaters can be located external to the sump and indirectly heat the liquid in the sump by heating the sump. The heaters located within the sump are immersible and directly heat the surrounding water or liquid. Immersible heaters, since they are exposed to the water/liquid, are subjected to harsher conditions than the external heaters. For example, immersible heaters are subject to calcium buildup, which depending on the hardness of the water/liquid, can quickly build up on the heater and just as quickly degrade the efficiency of the heater.

BRIEF DESCRIPTION

An aspect of the present disclosure relates to a household appliance comprising a treating chamber, a liquid sump, a liquid circuit fluidly coupling the liquid sump and the treating chamber, and an immersible laminate heater, located within the liquid sump. The laminate heater may have a pair of electrodes providing for the supplying of electricity to the immersible laminate heater. The laminate heater may have a laminate structure comprising an electrically non-conductive first layer, a thermoresistive nano-coating layer provided on the first layer and electrically connected to the pair of electrodes, and an electrically non-conductive second layer, overlying the nano-coating layer, and coupled with the first layer to encase the nano-coating layer, wherein at least one of the first layer and the second layer is thermally conductive. As used herein, "thermoresistive" means capable of resistive heating, where the process of passing an electric current through a material produces heat.

Another aspect of the present disclosure relates to an immersible resistive heating element with a pair of electrodes comprising a laminate structure of a first layer having a thermal conductivity $\lambda$ of at least 0.2-1 W/m K and an electrical conductivity $\sigma$ of less than $5 \times 10^2$-$5 \times 10^7$ S/m, a thermoresistive carbon nano-coating layer provided on the first layer and electrically connected to the pair of electrodes, and a second layer, overlying the nano-coating layer, and coupled with the first layer to encase and form a waterproof barrier about the nano-coating layer, and having a thermal conductivity $\lambda$ of at least 0.2-1 W/m K and an electrical conductivity $\sigma$ of less than $5 \times 10^2$-$5 \times 10^7$ S/m.

Another aspect of the present disclosure relates to a method of forming an immersible laminate resistive heating element, the method comprising applying a coating of electrically resistive material to a first electrical insulating layer, and applying a second electrical insulating layer over the electrically resistive material to encase the electrically resistive material in a waterproof barrier.

One example of a practical implementation of the above aspects is the combination of carbon nanotubes with a ceramic aluminum-based composite matrix, which demonstrates improved heat dissipation and improved bonding to surfaces. The carbon nanotubes can further increase the toughness and reduce the brittleness of the ceramic matrix. Along with exceptional flex and strength properties, the proposed technology offers enhanced resistance to static and dynamic corrosion, improved efficacy and reduced consumption of electric power. The carbon nanotube materials also demonstrate remarkable improvements in the generation of heat and rapid transfer of the heat to the surrounding water in the immersible heater environment.

DETAILED DESCRIPTION

Figure 1:
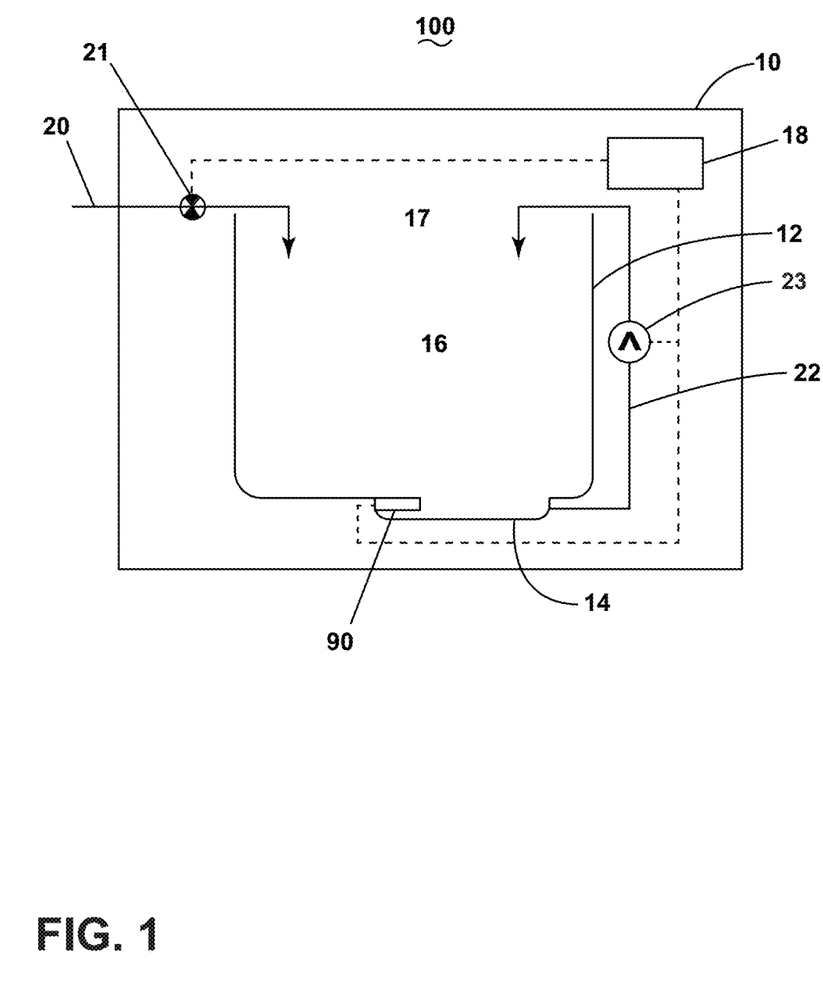
FIG. 1 is a schematic representation of a household appliance including a treating chamber and an immersible heater.

FIG. 1 illustrates a schematic representation of a household appliance 100 according to aspects of the present disclosure. The household appliance 100 can be any suitable household appliance, including, but not limited to, a dish treating appliance, a dishwasher having varying widths, sizes, and capacities, a stand-alone dishwasher, a multi-tub-type dishwasher, a drawer-type dishwasher, a sink-type dishwasher, a laundry treating appliance, a clothes washing machine, a clothes dryer, a combination washing machine and dryer, a dispensing dryer, a tumbling or stationary refreshing/revitalizing machine, an extractor, a non-aqueous washing apparatus, a clothes refresher, a revitalizing machine, etc. All of these examples of household appliances can receive one or more items in a treating chamber and then perform a cycle of operation on the article. The cycle of operation can include, by way of non-limiting example, cooking, heating, cooling, freezing, clothes washing, clothes drying, clothes treating, dish drying, dish washing, or dish treating. As used in this description, the term "items" is intended to be generic to any item, single or plural, that can be treated in the household appliance 100, including, without limitation, dishes, plates, pots, bowls, pans, glassware, silverware, other utensils, laundry items, clothes, bedding, towels, and food items.

The household appliance 100 includes a cabinet 10 with an interior 11, in which is provided a tub 12 that at least partially defines a treating chamber 16, with an access opening 17. A liquid sump 14 is fluidly coupled with the tub 12 and can be at least partially formed by the tub 12, or alternatively can be provided adjacent to or otherwise fluidly coupled with the tub 12. Alternatively, the liquid sump 14 can be a separate module that is coupled to the tub 12.

The household appliance 100 further includes a household water supply circuit in the form of a water supply line 20 and a water inlet valve 21, which controls the flow of water through the water supply line 20. The water supply line 20 can be fluidly coupled to a household water supply, thus, with the operation of the water inlet valve 21, water from the household water supply can be supplied to the treating chamber 16.

A liquid circuit 22 fluidly connects the liquid sump 14 to at least one of the treating chamber 16 or tub 12. A valve or a recirculation system pump 23 can control the flow of liquid through the liquid circuit 22. The liquid circuit 22 distributes or recirculates liquid from the liquid sump 14 to at least one of the treating chamber 16 or tub 12.

An immersible laminate heater 90 can be included for heating the liquid in the liquid sump 14. By way of non-limiting example, the immersible laminate heater 90 can be provided within or adjacent the treating chamber 16 or within or adjacent the liquid sump 14. The immersible laminate heater 90 need only be located such that it is at least partially immersed in the liquid present within at least one of the treating chamber 16 or the liquid sump 14. As illustrated, the immersible laminate heater 90 extends into and overlies at least a portion of the liquid sump 14, but does not lie on a surface of the liquid sump 14. However, it is contemplated that the immersible laminate heater 90 can reside adjacent to or rest on a portion of the liquid sump 14.

To implement the cycles of operation, a controller 18 can also be included in the household appliance 100 that operably couples with and controls the various components of household appliance 100 including the water inlet valve 21, the recirculation system pump 23, and the immersible laminate heater 90, The controller 18 can be located within the cabinet as illustrated, or it can alternatively be located within a closure, such as a door, of the appliance.

Figure 2:
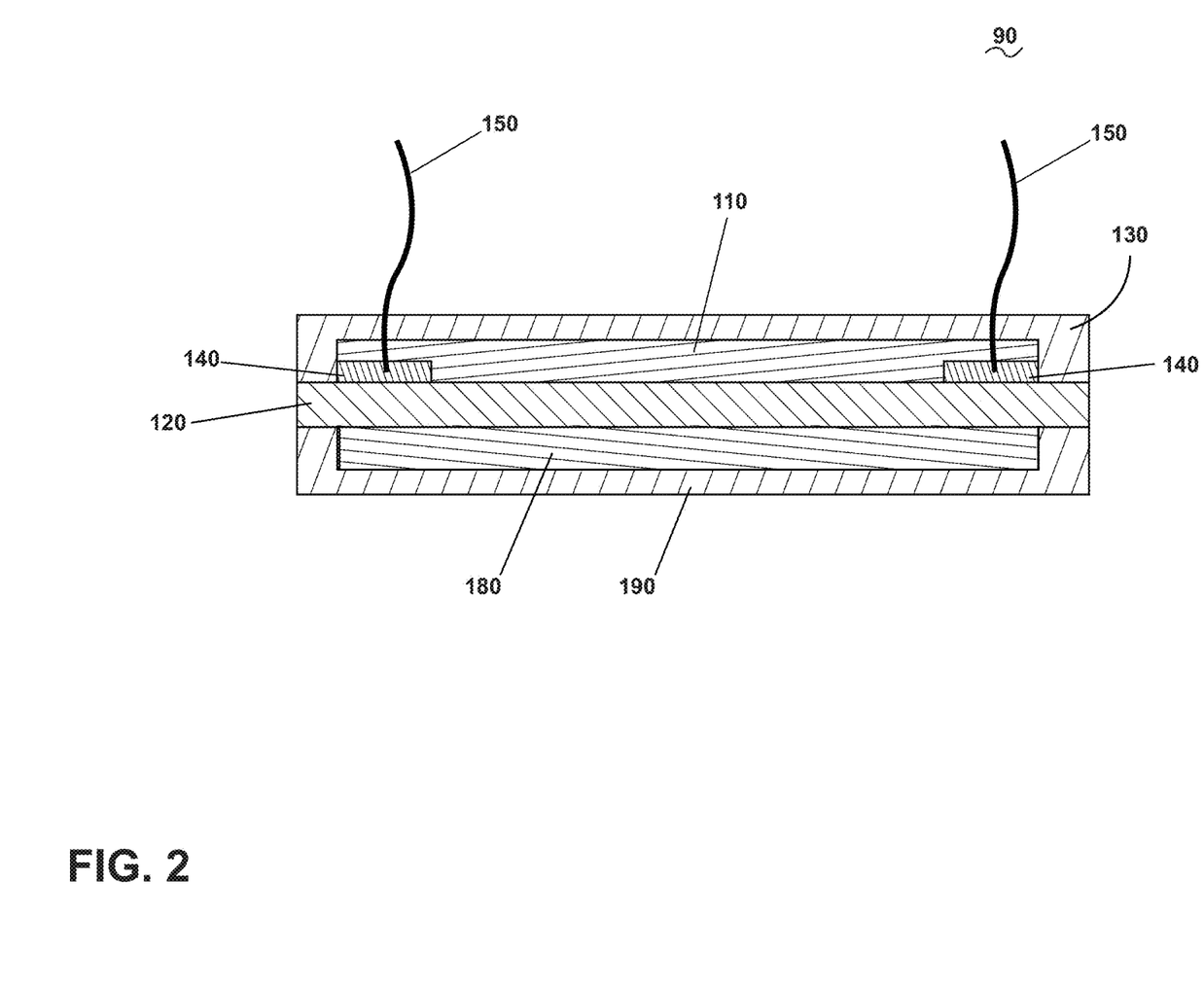
FIG. 2 is a cross-sectional view of the immersible heater of FIG. 1.

Turning now to FIG. 2, the immersible laminate heater 90 has a laminate structure that includes at least a first layer 120, a thermoresistive nano-coating layer 110 arranged on one side of the first layer 120, a second layer 130 overlying the other side of the thermoresistive nano-coating layer 110 and contacting the first layer 120 to encase the thermoresistive nano-coating layer 110. A pair of electrodes 140 extend between the first layer 120 and second layer 130 and are at least partially covered by the thermoresistive nano-coating layer 110. The pair of electrodes 140 are positioned such that they are spaced from one another and the thermoresistive nano-coating layer 110 is arranged to intervene between the pair of electrodes 140 and is in electrical connection with the pair of electrodes 140. Electrical connectors 150 extend from the pair of electrodes 140 to connect and electrically couple the controller 18 with the pair of electrodes 140.

A support layer 180 can be provided as a structural support of the first layer 120, with a thermoresistive nano-coating layer 110, and second layer 130. In some contemplated applications, the first layer 120 can reside on a portion of the liquid sump or tub, reducing or eliminating the need for a support layer. An optional third layer 190 can cover or encapsulate the support layer 180. If the support layer 180 is not used, then the third layer 190 can still be used and would cover or encapsulate the first layer 120. However, in some implementations, especially in the absence of the support layer 180, the third layer 190 would be redundant and not necessary. It is contemplated that the support layer 180 is most likely to be used when the immersible laminate heater is cantilevered relative to the tub or liquid sump as compared to resting on a portion of the tub or liquid sump.

The support layer 180 comprises a rigid material, such as steel, or a combination of any suitable rigid materials such that the support layer 180 can provide rigidity and structure to the immersible laminate heater 90, and specifically such that the first layer 120 is structurally supported by the support layer 180. The support layer 180 is provided on the opposite side of the first layer 120 than the thermoresistive nano-coating layer 110, such that the first layer 120 provides a barrier between the thermoresistive nano-coating layer 110 and the support layer 180.

The third layer 190 is provided on and overlies the support layer 180, such that the first layer 120 and the third layer 190 are provided on opposite sides or surfaces of the support layer 180. In one example, though the support layer 180 is provided between the first layer 120 and the third layer 190, the third layer 190 is at least partially in direct contact with the first layer 120, such as along an edge or an outer portion of the first layer 120, encasing and providing a waterproof barrier about the support layer 180.

The first layer 120 and the second layer 130 together are coupled to enclose or encase the thermoresistive nano-coating layer 110 and the pair of electrodes 140 and to form a waterproof barrier about the thermoresistive nano-coating layer 110 and the pair of electrodes 140. The first layer 120 and the second layer 130 encase the thermoresistive nano-coating layer 110 such that, when the immersible laminate heater 90 lies on the liquid sump 14 the encasing first layer 120 and second layer 130 can be substantially surrounded by wash water or liquid during the cycle of operation. In one example, the immersible laminate heater 90 comprises the support layer 180, the first layer 120, the second layer 130 and the third layer 190 encase the thermoresistive nano-coating layer 110 and the pair of electrodes 140, and the immersible laminate heater 90 extends into the liquid sump 14.

The first layer 120, the second layer 130, and third layer 190 each comprise a liquid-impermeable material, which is also an electrically non-conductive or electrically resistive material. At least one of the first layer 120 and the second layer 130 comprises a material that is also thermally conductive. In one example, both the first layer 120 and the second layer 130 comprise a material that is liquid-impermeable, electrically non-conductive and thermally conductive. When it is desired for the first layer 120 and second layer 130 to be thermally conductive, the thermal conductivity λ of each of the first layer 120 and the second layer 130 is at least 0.2-1 W/m K. When it is desired for the first layer 120 and second layer 130 to be electrically non-conductive, the electrical conductivity σ of each of the first layer 120 and the second layer 130 is less than $5\times10^2$-$5\times10^7$ S/m.

The first layer 120, the second layer 130 and the third layer 190 can be formed of any suitable material or combination of materials that fall within these ranges. By way of non-limiting example, the first layer 120 and the second layer 130 comprise a polyimide film. The first layer 120 and the second layer 130 can comprise the same material, though it will also be understood that the first layer 120 and the second layer 130 can comprise different materials from one another. The third layer 190 comprises a thermally conductive, electrically non-conductive material similar to or the same as the material in the first layer 120 and the second layer 130. In one example, the first layer 120, the second layer 130, and the third layer 190 can all be formed of the same material as one another. In one example, the first layer 120, the second layer 130, the support layer 180 and the third layer 190 are thermally conductive.

The thermoresistive nano-coating layer 110 generates heat when current is passed through it. The thermoresistive nano-coating layer 110 comprises a conductive material that is electrically resistive, such as carbon nanotubes, as well as other materials including, but not limited to, aluminum nanoparticles, ceramics, and fillers.

The pair of electrodes 140 comprise an electrically conducting material or combination of materials with an electrical conductivity σ of greater than $5\times10^7$ S/m, such as copper or silver. Like the pair of electrodes 140, the electrical connectors 150 can also comprise an electrically conducting material or combination of materials with an electrical conductivity σ of greater than $5\times10^7$ S/m, such as copper. However, it will be understood that, since the electrical connectors 150 may extend through and protrude from the second layer 130 and into the liquid sump 14, the electrical connectors 150 include an electrically insulating component, such as a coating or protective layer, to prevent the electrically conducting material from contacting the liquid in the liquid sump 14. The electrical connectors 150 in electrical contact with the pair of electrodes 140 are operably coupled with the controller 18 such that the controller 18 can selectively energize or provide electricity to the electrical connectors 150 to operate the immersible laminate heater 90 to generate heat. In one example, the electrical connectors 150 can be coupled to the controller 18 via an intermediate power source not shown. The immersible laminate heater 90 is designed to operate with an alternating current electrical supply, for example a 30 A, 120 V, 230 V, 240 V supply, such that the heater generates 1700 Watts or greater.

Figure 3:
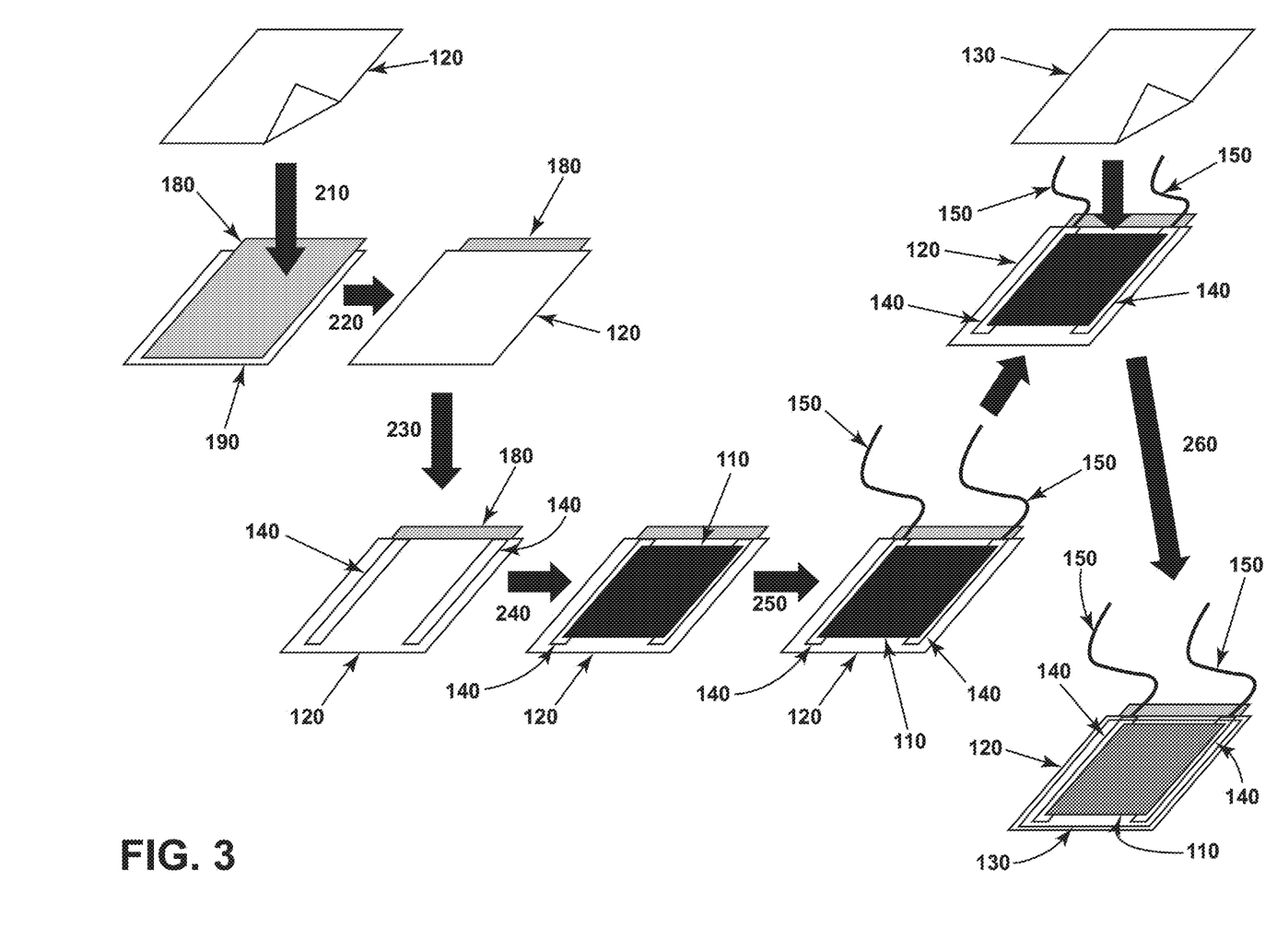
FIG. 3 is a schematic diagram illustrating the forming of the immersible heater of FIG. 1.

Turning now to FIG. 3, the layered laminate structure of the immersible laminate heater 90 provides for easy assembly and forming of the resistive immersible laminate heater 90 according to a method 200. When the support layer 180 is to be included, at 210, the assembly of the immersible laminate heater 90 begins with the assembly of the support layer 180 and the third layer 190 with the first layer 120, which can occur prior to the application of the thermoresistive nano-coating layer 110. By way of non-limiting example, the thermoresistive nano-coating layer 110 can be coated onto the at least one of the first layer 120 and the second layer 130, though it will be understood that any suitable method of application can be used, other non-limiting examples of which can include laminating, spray coating, dip coating, or simply layering. Alternatively or additionally, the thermoresistive nano-coating layer 110 can be applied onto the pair of electrodes 140.

As shown in FIG. 3, the third layer 190 is applied to the support layer 180 at 210 by any suitable method of application, non-limiting examples of which can include laminating, spray coating, dip coating, or simply layering. At 220, the coupled support layer 180 and third layer 190 are brought into contact with the first layer 120 so as to encase the support layer 180 in a waterproof barrier. If inclusion of the support layer 180 and the third layer 190 are not desired, steps 210 and 220 can be omitted, such that the assembly of the immersible laminate heater 90 begins at 230. At 230, the pair of electrodes 140 are placed on the first layer 120. In the case that the support layer 180 has already been provided, the pair of electrodes 140 are applied to the opposite side of the first layer 120 from the support layer 180. At 240, the electrically non-conductive thermoresistive nano-coating layer 110 is applied onto the first layer 120 and onto the pair of electrodes 140 so as to be in electrical contact with the pair of electrodes 140. The procedure at 240 can be performed any variety of ways known to those skilled in the art, non-limiting examples of which include spraying, painting, dipping, or sputtering. At 250, the electrical connectors 150 can be attached to the pair of electrodes 140, though it will be understood that the electrical connectors 150 can instead be attached to the pair of electrodes 140 at 230, prior to the addition of the thermoresistive nano-coating layer 110 to the electrodes 140. Alternatively, the addition of the thermoresistive nano-coating layer 110 to the first layer 120 can occur prior to the placement of the pair of electrodes 140 on the first layer 120, such that the pair of electrodes 140 would then be located between the thermoresistive nano-coating layer 110 and the third layer 130, rather than between the first layer 120 and the thermoresistive nano-coating layer 110 as would result from 240. In either case, the placement of the pair of electrodes 140 and the thermoresistive nano-coating layer 110 are both completed prior to the addition of the second layer 130. At 260, the second layer 130 is applied over the thermoresistive nano-coating layer 110 and the pair of electrodes 140, and also contacts the first layer 120. The arrangement of the first layer 120 and the second layer 130 encloses the thermoresistive nano-coating layer 110 and the pair of electrodes 140 in a waterproof barrier.

The thermoresistive nano-coating layer 110 can be provided directly onto at least one of the first layer 120 and the second layer 130, though it will be understood that the thermoresistive nano-coating layer 110 could be provided indirectly on the at least one of the first layer 120 and the second layer 130, such as by having an intervening layer or other components provided between the first layer 120 or the second layer 130 and the thermoresistive nano-coating layer 110. In one example, the thermoresistive nano-coating layer 110 is provided on only one side of the first layer 120.

Turning now to the operation of the immersible laminate heater 90, the controller 18 of the household appliance 100 can cause the pair of electrodes 140 connected to the thermoresistive nano-coating layer 110 to be energized. By way of example, the controller 18 can energize the power source not shown that is operably coupled to the pair of electrodes 140, in order to cause the pair of electrodes 140 to, in turn, be energized to resistively heat the thermoresistive nano-coating layer 110 to which the pair of electrodes 140 is electrically and thermally coupled. As electrical current is provided to the thermoresistive nano-coating layer 110 from the pair of electrodes 140 by the controller 18 or the power source, heat is generated by the thermoresistive nano-coating layer 110 and provided outwardly through the thermally conductive first layer 120 and thermally conductive second layer 130, and in some cases through the support layer 180 and third layer 190. Energy efficient performance of the thermoresistive nano-coating layer 110 can be achieved to raise the temperature of the thermoresistive nano-coating layer 110 in such a way that highly uniform surface heating through the resistive heating capabilities of the thermoresistive nano-coating layer 110 can be realized while requiring relatively less usage of electrical power as compared to conventional coil heating elements.

When the thermoresistive nano-coating layer 110 is energized to be resistively heated in this manner, the first layer 120 and the second layer 130 allow thermal transfer, transmitting, or transmission of the heat outwardly from the thermoresistive nano-coating layer 110 towards the washing liquid. Since the first layer 120, second layer 130, and third layer 190 are thermally transmissive and liquid-impermeable, and the support layer 180 is thermally transmissive, the first layer 120, second layer 130, support layer 180, and third layer 190 are configured to thermally transfer or transmit heat, the heat provided from the thermoresistive nano-coating layer 110 can accordingly be transmitted outwardly from the thermoresistive nano-coating layer 110 through the thermally transmissive and liquid-impermeable barrier formed by the first layer 120, second layer 130, and third layer 190 to the surrounding medium such as washing liquid. In this manner, the immersible laminate heater 90 is configured to resistively heat the liquid in the household appliance 100 by providing heat to the liquid in which the immersible laminate heater 90 is submerged or partially submerged. Further, the first layer 120, second layer 130, and third layer 190 are liquid impermeable and encase the immersible laminate heater 90 to protect the immersible laminate heater 90 from corrosion.

The immersible laminate heater 90 can be used to heat liquid in household appliances such as laundry treatment appliances and dishwashers. An immersible laminate heater 390 is shown in the environment of a vertical axis washer 300 in FIG. 4 which has components analogous to those described in FIG. 1, where the corresponding part numbers have increased by 300. The vertical axis washer 300 includes a door 301, a cabinet 310 with an interior 311, in which is provided a tub 312 that at least partially defines a treating chamber 316. A liquid sump 314 is fluidly coupled with the tub 312 and can be at least partially formed by the tub 312, or alternatively can be provided adjacent to or otherwise fluidly coupled with the tub 312. Alternatively, the liquid sump 314 can be a separate module that is coupled to the tub 312. The vertical axis washer 300 can further include an agitator 313, a drive shaft 315, and a motor 317.

Figure 4:
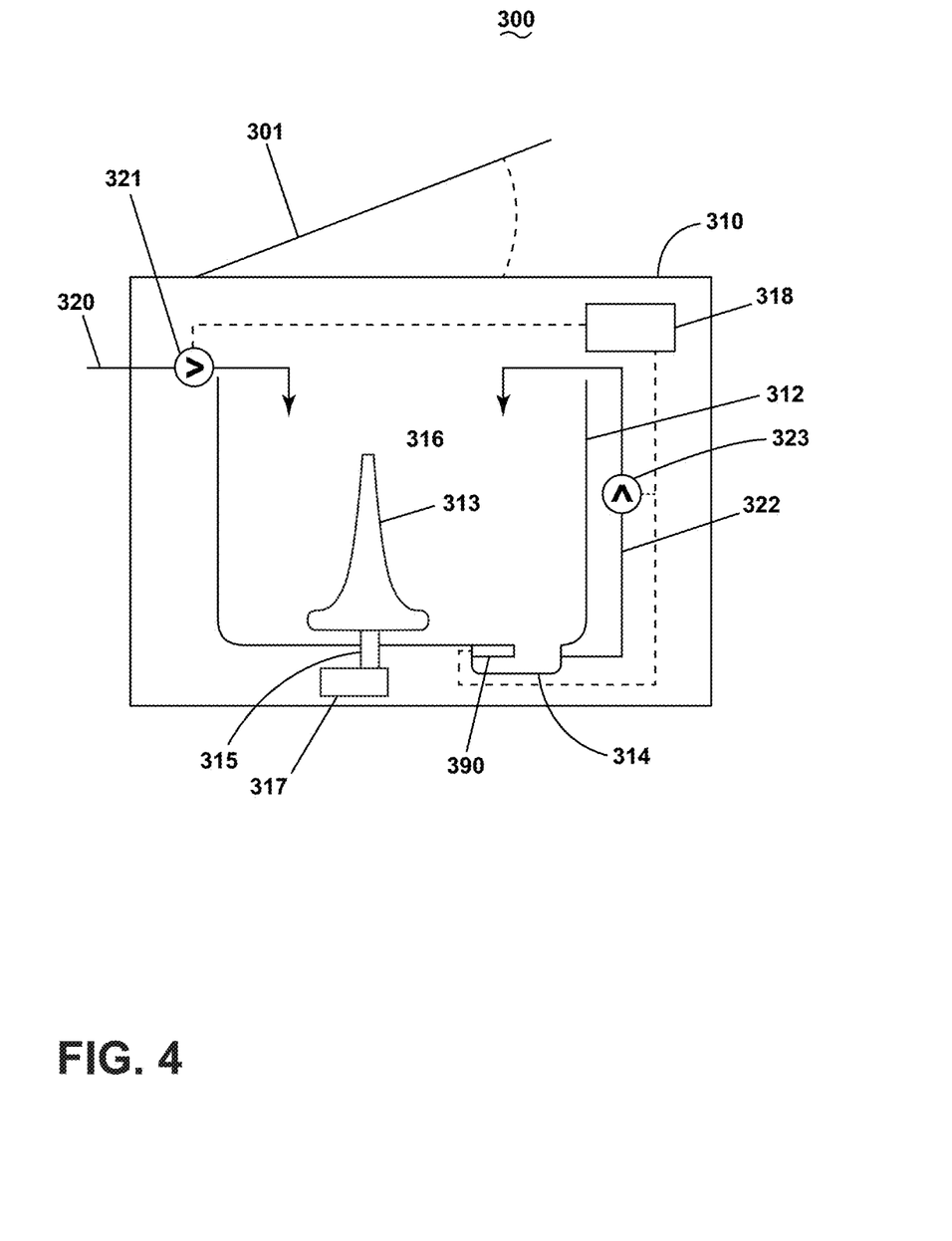
FIG. 4 is a schematic diagram showing the immersible heater of FIG. 1 in the environment of a vertical axis washer.

The vertical axis washer 300 further includes a household water supply circuit in the form of a water supply line 320 and a water inlet valve 321, which controls the flow of water through the water supply line 320. The water supply line 320 can be fluidly coupled to a household water supply, thus, with the operation of the water inlet valve 321, water from the household water supply can be supplied to the treating chamber 316.

A liquid circuit 322 fluidly connects the liquid sump 314 to at least one of the treating chamber 316 or tub 312. A valve or a recirculation system pump 323 can control the flow of liquid through the liquid circuit 322. The liquid circuit 322 distributes or recirculates liquid from the liquid sump 314 to at least one of the treating chamber 316 or tub 312.

An immersible laminate heater 390 can be included for heating the liquid in the liquid sump 314. By way of non-limiting example, the immersible laminate heater 390 can be provided within or adjacent the treating chamber 316 or within or adjacent the liquid sump 314. The immersible laminate heater 390 need only be located such that it is at least partially immersed in the liquid present within at least one of the treating chamber 316 or the liquid sump 314. As illustrated, the immersible laminate heater 390 extends into and overlies at least a portion of the liquid sump 314, but does not lie on a surface of the liquid sump 314. However, it is contemplated that the immersible laminate heater 390 can reside adjacent to or rest on a portion of the liquid sump 314. The immersible laminate heater 390 can lie on the liquid sump or protrude into the liquid sump to heat the wash water that recirculates during operation.

To implement the cycles of operation, a controller 318 can also be included in the vertical axis washer 300 that operably couples with and controls the various components of the vertical axis washer 300 including the water inlet valve 321, the recirculation system pump 323, and the immersible laminate heater 390, The controller 318 can be located within the cabinet as illustrated, or it can alternatively be located within a closure, such as a door, of the vertical axis washer 300.

Figure 5:
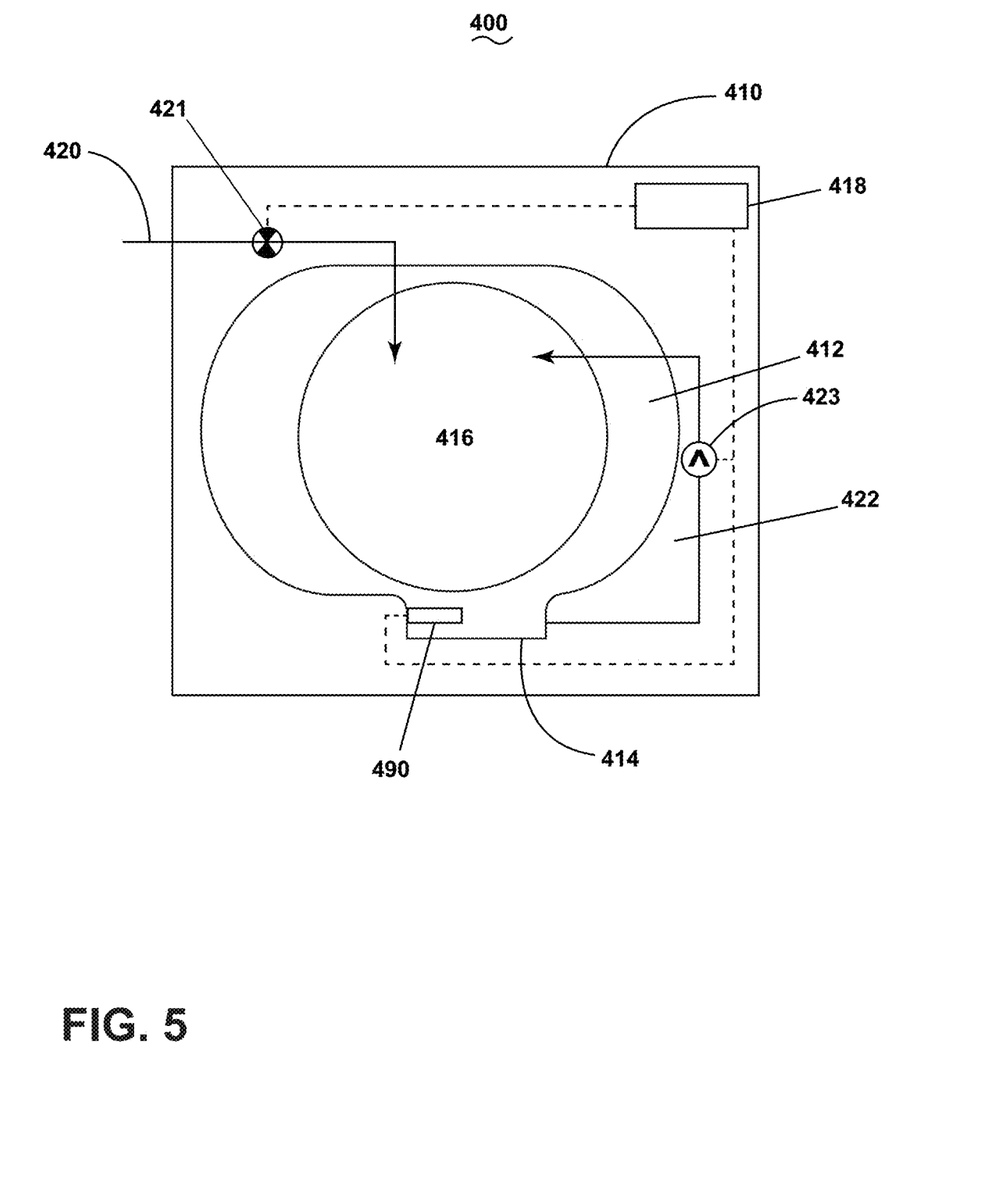
FIG. 5 is a schematic diagram showing the immersible heater of FIG. 1 in the environment of a horizontal axis washer.

FIG. 5. illustrates an immersible laminate heater 490 in the environment of a horizontal axis washer 400. The horizontal axis washer 400 includes a cabinet 410, a drum 412 that at least partially defines a treating chamber 416, a liquid sump 414, and other components analogous to those shown in FIG. 1, where the corresponding part numbers have increased by 400. The immersible laminate heater 490 can lie on the liquid sump or protrude into the liquid sump to heat the wash water that recirculates during operation. A liquid sump 414 is fluidly coupled with the drum 412 and can be at least partially formed by the drum 412, or alternatively can be provided adjacent to or otherwise fluidly coupled with the drum 412. Alternatively, the liquid sump 414 can be a separate module that is coupled to the drum 412.

The horizontal axis washer 400 further includes a household water supply circuit in the form of a water supply line 420 and a water inlet valve 421, which controls the flow of water through the water supply line 420. The water supply line 420 can be fluidly coupled to a household water supply, thus, with the operation of the water inlet valve 421, water from the household water supply can be supplied to the treating chamber 416.

A liquid circuit 422 fluidly connects the liquid sump 414 to at least one of the treating chamber 416 or drum 412. A valve or a recirculation system pump 423 can control the flow of liquid through the liquid circuit 422. The liquid circuit 422 distributes or recirculates liquid from the liquid sump 414 to at least one of the treating chamber 416 or drum 412.

An immersible laminate heater 490 can be included for heating the liquid in the liquid sump 414. By way of non-limiting example, the immersible laminate heater 490 can be provided within or adjacent the treating chamber 416 or within or adjacent the liquid sump 414. The immersible laminate heater 490 need only be located such that it is at least partially immersed in the liquid present within at least one of the treating chamber 416 or the liquid sump 414. As illustrated, the immersible laminate heater 490 extends into and overlies at least a portion of the liquid sump 414, but does not lie on a surface of the liquid sump 414. However, it is contemplated that the immersible laminate heater 490 can reside adjacent to or rest on a portion of the liquid sump 414.

To implement the cycles of operation, a controller 418 can also be included in the horizontal axis washer 400 that operably couples with and controls the various components of horizontal axis washer 400 including the water inlet valve 421, the recirculation system pump 423, and the immersible laminate heater 490, The controller 418 can be located within the cabinet as illustrated, or it can alternatively be located within a closure, such as a door, of the horizontal axis washer 400.

Figure 6:
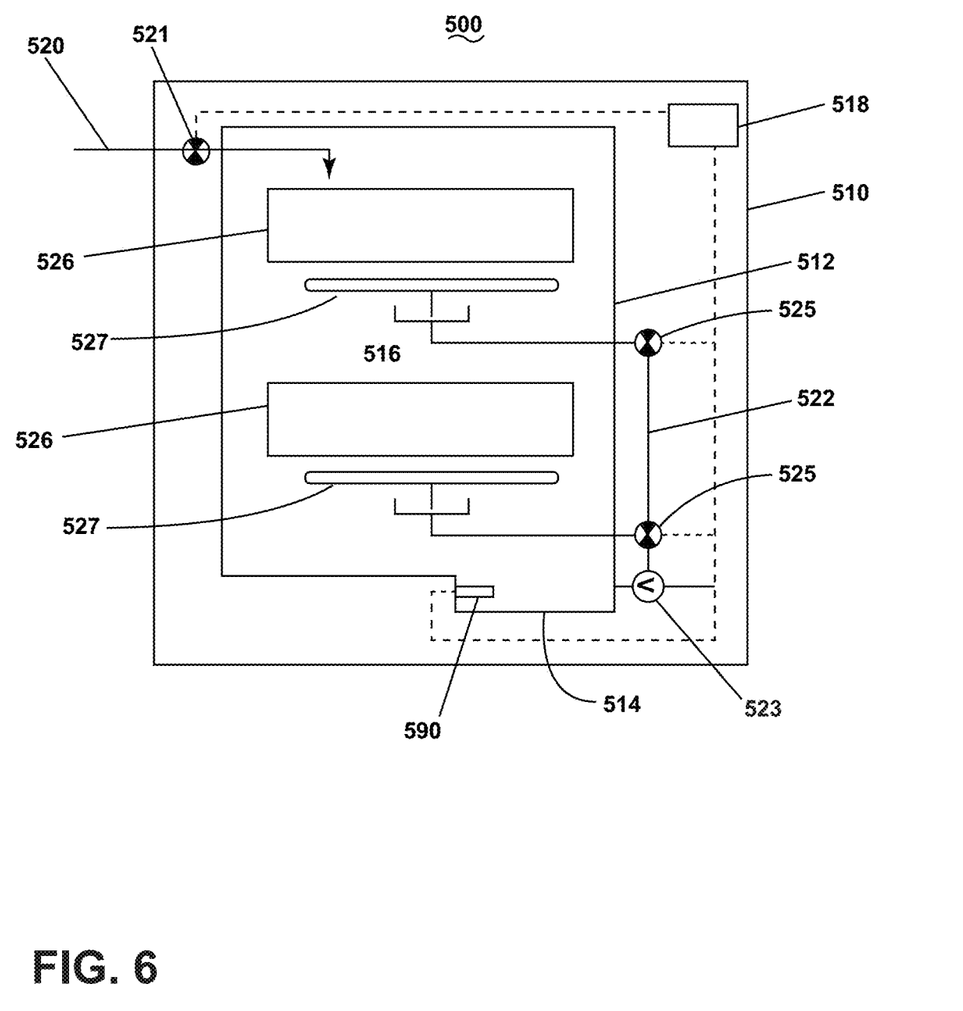
FIG. 6 is a schematic diagram showing the immersible heater of FIG. 1 in the environment of a dishwasher.

FIG. 6. illustrates an immersible laminate heater 590 in the environment of a dishwasher 500. The dishwasher 500 includes components analogous to those shown in FIG. 1, where the corresponding part numbers have increased by 500. The dishwasher 500 includes a cabinet 510 with a tub 512 that at least partially defines a treating chamber 516. A liquid sump 514 is fluidly coupled with the tub 512 and can be at least partially formed by the tub 512, or alternatively can be provided adjacent to or otherwise fluidly coupled with the tub 512. Alternatively, the liquid sump 514 can be a separate module that is coupled to the tub 512.

The dishwasher 500 further includes a household water supply circuit in the form of a water supply line 520 and a water inlet valve 521, which controls the flow of water through the water supply line 520. The water supply line 520 can be fluidly coupled to a household water supply, thus, with the operation of the water inlet valve 521, water from the household water supply can be supplied to the treating chamber 516.

A liquid circuit 522 fluidly connects the liquid sump 514 to at least one of the treating chamber 516 or tub 512. At least one valve 525 and a recirculation system pump 523 can control the flow of liquid through the liquid circuit 522. The liquid circuit 522 distributes or recirculates liquid from the liquid sump 514 to at least one of the treating chamber 516 or tub 512.

An immersible laminate heater 590 can be included for heating the liquid in the liquid sump 514. By way of non-limiting example, the immersible laminate heater 590 can be provided within or adjacent the treating chamber 516 or within or adjacent the liquid sump 514. The immersible laminate heater 590 need only be located such that it is at least partially immersed in the liquid present within at least one of the treating chamber 516 or the liquid sump 514. As illustrated, the immersible laminate heater 590 extends into and overlies at least a portion of the liquid sump 514, but does not lie on a surface of the liquid sump 514. However, it is contemplated that the immersible laminate heater 590 can reside adjacent to or rest on a portion of the liquid sump 514.

To implement the cycles of operation, a controller 518 can also be included in the dishwasher 500 that operably couples with and controls the various components of dishwasher 500 the water inlet valve 521, the recirculation system pump 523, and the immersible laminate heater 590, The controller 518 can be located within the cabinet as illustrated, or it can alternatively be located within a closure, such as a door, of the dishwasher 500.

The dishwasher 500 further includes item holders 526 and spray arms 527 that are connected to the liquid circuit 522. The immersible laminate heater 590 can lie on the liquid sump 514 or protrude into the liquid sump 514 to heat the wash water that recirculates during operation.

The aspects described herein can be used to provide an immersible laminate heater for a household appliance that is adapted for immersion in water, as well as thermoresistive heating. Having a layered structure can result in efficient heating of the water and stability of the heating element. By placing the nano-coating between thermally conductive and electrically insulating layers, the durability and efficiency of the heater can be improved. A support layer further increases the stability and rigidity of the heater and thereby improves the performance and durability of the heater.

It will also be understood that various changes and/or modifications can be made without departing from the spirit of the present disclosure. By way of non-limiting example, although the present disclosure is described for use with a household appliance provided as a horizontal axis laundry treating appliance, it will be recognized that the immersible heater can be employed with various contexts, including vertical axis laundry treating appliances and/or use with other types of household appliances in which liquid is heated during a cycle of operation, such as dishwashers and dish treating appliances.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure. Further aspects of the invention are provided by the subject matter of the following clauses, and in addition to the concepts covered by the below claims, the following concepts can also provide the basis for claims in any possible combinations:

1. A household appliance 100 comprising: a treating chamber 16, a liquid sump 14, a liquid circuit 22 fluidly coupling the liquid sump 14 and the treating chamber 16, and an immersible laminate heater 90, located within the liquid sump 14, and having a pair of electrodes 140 and a laminate structure comprising: an electrically non-conductive first layer 120, a thermoresistive nano-coating layer 110 provided on the first layer 120 and electrically connected to the pair of electrodes 140, and an electrically non-conductive second layer 130, overlying the thermoresistive nano-coating layer 110, and coupled with the first layer 120 to encase the thermoresistive nano-coating layer 110, wherein at least one of the first layer 120 and the second layer 130 is thermally conductive.

2. The household appliance 100 of any of the preceding clauses wherein both the first layer 120 and the second layer 130 are thermally conductive.

3. The household appliance 100 of any of the preceding clauses wherein the thermal conductivity λ of the first layer 120 and of the second layer 130 is at least 0.2-1 W/m K.

4. The household appliance 100 of any of the preceding clauses wherein the electrically non-conductive first layer 120 has an electrical conductivity σ of less than $5\times10^2$-$5\times10^7$ S/m.

5. The household appliance 100 of any of the preceding clauses wherein the pair of electrodes 140 extends between the first layer 120 and the second layer 130.

6. The household appliance 100 of any of the preceding clauses wherein the thermoresistive nano-coating layer 110 is applied to the pair of electrodes 140 and at least one of the first layer 120 and the second layer 130.

7. The household appliance 100 of any of the preceding clauses wherein neither the first layer 120 nor the second layer 130 lie on the liquid sump 14.

8. The household appliance 100 of any of the preceding clauses wherein the immersible laminate heater 90 extends into and overlies a portion of the liquid sump 14.

9. The household appliance 100 of any of the preceding clauses wherein the laminate structure further comprises a support layer 180 on an opposite side of the first layer 120 than the thermoresistive nano-coating layer 110.

10. The household appliance 100 of any of the preceding clauses further comprising an electrically non-conductive third layer 190 overlying the support layer 180 and coupled to the first layer 120.

11. The household appliance 100 of any of the preceding clauses wherein the first layer 120, the second layer 130, and the third layer 190 are the same material.

12. The household appliance 100 of any of the preceding clauses wherein the thermoresistive nano-coating layer 110 is a carbon nanotube coating.

13. An immersible resistive heating element with a pair of electrodes 140 comprising a laminate structure of: a first layer 120 having a thermal conductivity $\lambda$ of at least 0.2-1 W/m K and an electrical conductivity $\sigma$ of less than $5 \times 10^2$-$5 \times 10^7$ S/m, a thermoresistive carbon nano-coating layer 110 provided on the first layer 120 and electrically connected to the pair of electrodes 140, and a second layer 130, overlying the thermoresistive nano-coating layer 110, and coupled with the first layer 120 to encase and form a waterproof barrier about the thermoresistive nano-coating layer 110, and having a thermal conductivity $\lambda$ of at least 0.2-1 W/m K and an electrical conductivity $\sigma$ of less than $5 \times 10^2$-$5 \times 10^7$ S/m.

14. The immersible resistive heating element of any of the preceding clauses wherein the laminate structure further comprises a support layer 180 on an opposite side of the first layer 120 than the thermoresistive nano-coating layer 110, and optionally further comprising an electrically non-conductive third layer 190 overlying the support layer 180 and coupled to the first layer 120 to encase the support layer 180 and form a waterproof barrier.

15. The immersible resistive heating element of any of the preceding clauses wherein the pair of electrodes 140 extend between the first layer 120 and second layer 130, and optionally further wherein the thermoresistive nano-coating layer 110 is applied to the pair of electrodes 140 and at least one of the first layer 120 or the second layer 130.

16. A method of forming an immersible laminate resistive heating element 100, the method comprising: applying a coating of electrically resistive material 110 to a first electrical insulating layer 120, and applying a second electrical insulating layer 130 over the electrically resistive material 110 to encase the electrically resistive material 110 in a waterproof barrier.

17. The method of any of the preceding clauses further comprising placing a pair of pair of electrodes between the first and second layers prior to the applying of the second layer.

18. The method of any of the preceding clauses wherein the placing the pair of electrodes 140 occurs prior to applying the coating of electrically resistive material 110.

19. The method of any of the preceding clauses further comprising supporting the first layer 120 with a support layer.

20. The method of any of the preceding clauses wherein supporting the first layer 120 occurs prior to the applying the coating of electrically resistive material.

21. The method of any of the preceding clauses further comprising applying a third electrically insulating layer 190 over the support layer 180 to encase the support layer 180 in a waterproof barrier.

22. A method of any of the preceding clauses of forming an immersible laminate resistive heating element, the method comprising applying a coating of electrically resistive material to a first electrical insulating layer, and applying a second electrical insulating layer over the electrically resistive material to encase the electrically resistive material in a waterproof barrier.

23. A method of any of the preceding clauses of forming an immersible laminate resistive heating element further comprising placing a pair of electrodes between the first and second layers prior to the applying of the second layer.

24. A method of any of the preceding clauses of forming an immersible laminate resistive heating element wherein the placing the pair of electrodes occurs prior to applying the coating of electrically resistive material.

25. A method of any of the preceding clauses of forming an immersible laminate resistive heating element further comprising supporting the first layer with a support layer.

26. A method of any of the preceding clauses of forming an immersible laminate resistive heating element wherein supporting the first layer occurs prior to the applying the coating of electrically resistive material.

27. A method of any of the preceding clauses of forming an immersible laminate resistive heating element further comprising applying a third electrically insulating layer over the support layer to encase the support layer in a waterproof barrier.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims. Hence, specific dimensions and other physical characteristics relating to the aspects of the present disclosure are not to be considered as limiting, unless expressly stated otherwise.

What is claimed is:

1. A household appliance comprising:
a treating chamber,
a liquid sump,
a liquid circuit fluidly coupling the liquid sump and the treating chamber, and
an immersible laminate heater located within the liquid sump and having a pair of electrodes and a laminate structure wherein the immersible laminate heater is configured to operate with a household alternating current electrical supply, the laminate structure further comprising:
a first layer in the form of an electrically non-conductive first layer,
a thermoresistive nano-coating layer provided on the first layer and electrically connected to the pair of electrodes, and a second layer in the form of an electrically non-conductive second layer overlying the thermoresistive nano-coating layer and coupled with the first layer to encase the thermoresistive nano-coating layer, wherein at least one of the first layer and the second layer is thermally conductive.

2. The household appliance of claim 1, wherein both the first layer and the second layer are thermally conductive.

3. The household appliance of claim 2, wherein the thermal conductivity $\lambda$ of the first layer and of the second layer is at least 0.2-1 W/m K.

4. The household appliance of claim 1, wherein the electrically non-conductive first layer has an electrical conductivity $\sigma$ of less than $5\times10^2$-$5\times10^7$ S/m.

5. The household appliance of claim 1, wherein the pair of electrodes extends between the first layer and the second layer.

6. The household appliance of claim 1, wherein the thermoresistive nano-coating layer is applied to the pair of electrodes and at least one of the first layer and the second layer.

7. The household appliance of claim 1, wherein neither the first layer nor the second layer lie on the liquid sump 14.

8. The household appliance of claim 1, wherein the immersible laminate heater extends into and overlies a portion of the liquid sump.

9. The household appliance of claim 1, wherein the laminate structure further comprises a support layer on an opposite side of the first layer than the thermoresistive nano-coating layer.

10. The household appliance of claim 9, further comprising an electrically non-conductive third layer overlying the support layer and coupled to the first layer.

11. The household appliance of claim 10, wherein the first layer, the second layer, and the third layer are the same material.

12. The household appliance of claim 1, wherein the thermoresistive nano-coating layer is a carbon nanotube coating.

13. An immersible resistive heating element with a pair of electrodes comprising a laminate structure of:
a first layer having a thermal conductivity $\lambda$ of at least 0.2-1 W/m K and an electrical conductivity $\sigma$ of less than $5\times10^2$-$5\times10^7$ S/m,
a thermoresistive carbon nano-coating layer provided on the first layer and electrically connected to the pair of electrodes, and
a second layer overlying the thermoresistive nano-coating layer and coupled with the first layer to encase and form a waterproof barrier about the thermoresistive nano-coating layer, and having a thermal conductivity $\lambda$ of at least 0.2-1 W/m K and an electrical conductivity $\sigma$ of less than $5\times10^2$-$5\times10^7$ S/m;
wherein the immersible resistive heating element is configured to generate at least 1700 Watts.

14. The immersible resistive heating element of claim 13, wherein the laminate structure further comprises a support layer on an opposite side of the first layer than the thermoresistive nano-coating layer, and optionally further comprising an electrically non-conductive third layer overlying the support layer and coupled to the first layer to encase the support layer and form a waterproof barrier.

15. The immersible resistive heating element of claim 13, wherein the pair of electrodes extend between the first layer and second layer, and optionally further wherein the thermoresistive nano-coating layer is applied to the pair of electrodes and at least one of the first layer or the second layer.

16. A method of forming an immersible laminate resistive heating element, the method comprising:
applying a coating of electrically resistive material to a first electrical insulating layer, and
applying a second electrical insulating layer over the coating of electrically resistive material to encase the coating of electrically resistive material in a waterproof barrier;
wherein the coating is configured to withstand operation of the immersible laminate resistive heating element, which is configured to generate at least 1700 Watts.

17. The method of claim 16, further comprising placing a pair of electrodes between the first and second layers prior to the applying of the second layer.

18. The method of claim 17, wherein the placing the pair of electrodes occurs prior to applying the coating of electrically resistive material.

19. The method of claim 16, further comprising supporting the first layer with a support layer and wherein supporting the first layer occurs prior to the applying the coating of electrically resistive material.

20. The method of claim 19, further comprising applying a third electrically insulating layer over the support layer to encase the support layer in a waterproof barrier.

21. The household appliance of claim 1, wherein the immersible laminate heater is configured to operate with the household alternating current electrical supply being at least 120 Volts.

22. The household appliance of claim 1, wherein the immersible laminate heater is configured to generate at least 1700 Watts.

* * * * *